(12) United States Patent
Robillard et al.

(10) Patent No.: US 11,268,053 B2
(45) Date of Patent: Mar. 8, 2022

(54) UNIT DOSE PACKS WITH NON-WATER SOLUBLE COVERS

(71) Applicant: Henkel IP & Holding GmbH, Duesseldorf (DE)

(72) Inventors: Holly Ann Robillard, Stratford, CT (US); Sandra Rubino Pisarczyk, Winsted, CT (US); Cathelina Vasty Eliacin, Stratford, CT (US); Karli J. Smith, Middletown, CT (US); Erin Michelle Schweitzer, West Haven, CT (US); Leland L. Civils, Norwalk, CT (US); Chris Crosby Turek, Stamford, CT (US); Brian A. Warren, Bowling Green, KY (US); Daniel T. Piorkowski, Fairfield, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 130 days.

(21) Appl. No.: 16/547,508

(22) Filed: Aug. 21, 2019

(65) Prior Publication Data

US 2021/0054313 A1    Feb. 25, 2021

(51) Int. Cl.

| C11D 17/04 | (2006.01) |
| C11D 17/06 | (2006.01) |
| C11D 3/00 | (2006.01) |
| C11D 3/42 | (2006.01) |
| B65D 65/46 | (2006.01) |
| C11D 17/00 | (2006.01) |
| D06F 39/02 | (2006.01) |

(52) U.S. Cl.
CPC ............ *C11D 17/042* (2013.01); *B65D 65/46* (2013.01); *C11D 3/001* (2013.01); *C11D 3/0036* (2013.01); *C11D 3/42* (2013.01); *C11D 17/0039* (2013.01); *C11D 17/06* (2013.01); *D06F 39/02* (2013.01)

(58) Field of Classification Search
None
See application file for complete search history.

(56) References Cited

U.S. PATENT DOCUMENTS 3,226,753 A * 1/1966 Paul ................. A47L 13/17
                                                15/210.1
3,955,920 A * 5/1976 Krauch ................. C08F 2/46
                                                   8/137

(Continued)

FOREIGN PATENT DOCUMENTS

| CA | 2055980 A1 | 5/1992 |
| GB | 2376680 A | 12/2002 |
| JP | H108098 A | 1/1998 |

OTHER PUBLICATIONS

European Patent Office, European Search Report, EP20192179 Completion Date: Dec. 23, 2020, dated Jan. 20, 2021, pp. 2-10, Munich, Germany.

*Primary Examiner* — Lorna M Douyon
(74) *Attorney, Agent, or Firm* — Bojuan Deng (57) ABSTRACT

Unit dose packs and methods of producing and using the same are provided. In accordance with one embodiment, a unit dose pack includes a cover that is non-water soluble, and a wash composition encapsulated within the cover to form the unit dose pack. The wash composition is a solid. The cover is stitched together with a thread to form a pouch around the wash composition, and the thread is water soluble.

17 Claims, 2 Drawing Sheets

(56) References Cited

U.S. PATENT DOCUMENTS

| | | | |
|---|---|---|---|
| 4,188,304 A | | 2/1980 | Clarke et al. |
| 4,776,455 A | * | 10/1988 | Anderson ............ C11D 17/046 206/0.5 |
| 5,053,270 A | | 10/1991 | Mack |
| 5,780,418 A | * | 7/1998 | Niinaka ................... A61K 8/02 206/484 |
| 2003/0119695 A1 | * | 6/2003 | Weuthen ................ C11D 1/721 510/295 |
| 2009/0181587 A1 | * | 7/2009 | Kang .................. C11D 17/046 442/59 |

\* cited by examiner

UNIT DOSE PACKS WITH NON-WATER SOLUBLE COVERS

FIELD OF THE INVENTION

The technical field relates to unit dose packs and methods of producing the same, and more particularly relates to unit dose packs with non-water soluble covers and methods of producing the same.

BACKGROUND OF THE INVENTION

Detergent in unit dose packs is available for a variety of washing activities, such as garment laundering and dish washing. The unit dose pack provides a pre-measured quantity of detergent that is easy to carry and convenient to use. The unit dose pack minimizes over-dosage of detergent and has proven popular with consumers.

Many unit dose packs include a wash composition that is encapsulated within a pouch made of a water soluble film, where the wash composition includes detergent, solvents, and other components useful for cleaning or other purposes. The films are designed to dissolve in the laundry, so no residue remains. However, in some instances the unit dose pack may become positioned such that the film does not completely dissolve. The film residue is often sticky and leaves an unpleasant mess on one or more garments. The film residue may be washed out, but the garment launderer must take further action.

Many users will add detergent to a clothing washing machine, and then add a separate fabric softener to a clothing drying machine to soften the garments. This requires two separate actions by the launderer, and also requires the use of two different products.

Accordingly, it is desirable to provide a unit dose pack that does not include a water soluble film that can leave a sticky mess, and methods of producing and using the same. In addition, it is desirable to provide unit dose packs that function to aid in cleaning cloths in a washing machine and further aid in softening cloths in a dryer, and methods of producing and using the same. Furthermore, other desirable features and characteristics will become apparent from the subsequent detailed description and the appended claims, taken in conjunction with the accompanying drawings and the foregoing technical field and background.

BRIEF SUMMARY OF THE INVENTION

Unit dose packs and methods of producing and using the same are provided. In accordance with one embodiment, a unit dose pack includes a cover that is non-water soluble, and a wash composition encapsulated within the cover to form the unit dose pack. The wash composition is a solid. The cover is stitched together with a thread to form a pouch around the wash composition, and the thread is water soluble.

A unit dose pack is provided in another embodiment. The unit dose pack includes a cover that is non-water soluble, and a wash composition encapsulated within the cover. The wash composition comprises a surfactant. The cover is stitched together to form a pouch around the wash composition, where the thread is soluble. A laundering additive is applied onto the cover, where the laundering additive is non-water soluble.

A method of producing a unit dose pack is provided in yet another embodiment. The method includes forming a wash composition that includes a surfactant. A cover is stitched around the wash composition with a thread to form a pouch such that the wash composition is encapsulated within the pouch to form the unit dose pack. The cover is non-water soluble, and the thread is water soluble.

BRIEF DESCRIPTION OF THE DRAWINGS

The present embodiments will hereinafter be described in conjunction with the following drawing figures, wherein like numerals denote like elements, and wherein.

DETAILED DESCRIPTION OF THE INVENTION

The following detailed description is merely exemplary in nature and is not intended to limit the unit dose pack, or the method for producing or using the same. Furthermore, there is no intention to be bound by any theory presented in the preceding background or the following detailed description.

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated.

A unit dose pack includes a wash composition encapsulated within a cover, where the cover is not water soluble. The wash composition may be a solid, so it remains within the cover prior to use. The cover is stitched together with a water soluble thread to encapsulate the wash composition. Water in a washing machine dissolves the water soluble thread, and thereby releases the wash composition encapsulated within. The cover may be porous or permeable in some embodiments, so the wash composition may begin leaching through the cover prior to the thread dissolving. Also, a non-water soluble laundering additive may be added to the cover, where the laundering additive remains on the cover through the washing machine and into the dryer. The laundering additive may include a fabric softener for the dryer, a fragrance for the dryer, a carrier, or other compounds. In alternate embodiments, the laundering additive includes compounds intended to provide a benefit in the washing machine, including but not limited to a fabric softener for the washing machine or a fragrance for the washing machine.

Figure 1:
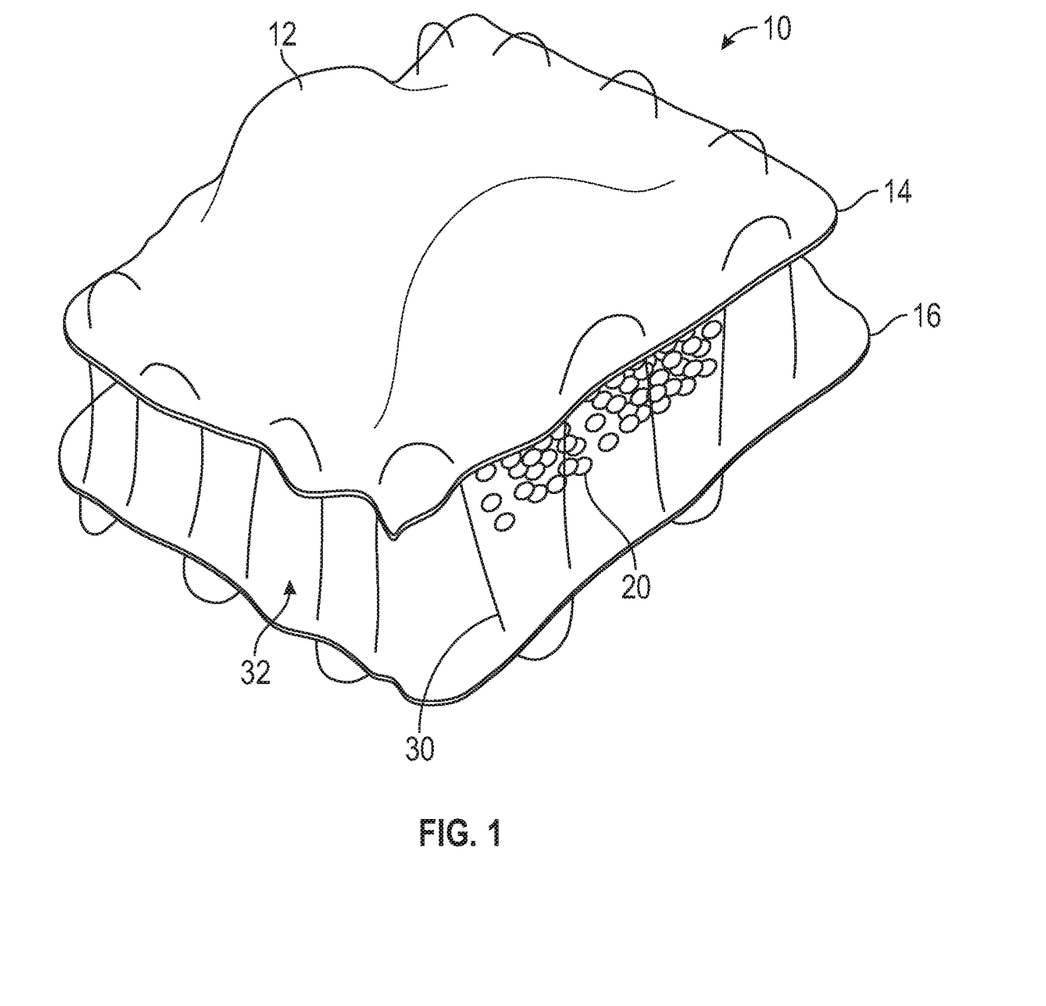
FIG. 1 is an exploded perspective view of an embodiment of a unit dose pack.

An exemplary embodiment of a unit dose pack 10 is illustrated in FIG. 1. The unit dose pack 10 includes a cover 12 that is non-water soluble, and the cover 12 is stitched about a wash composition 20 with a thread 30, where the thread 30 is water soluble. As used herein, an item or material is "non-water soluble" if that item or material has a water solubility of about 0.01 grams or less of the item or material in 1,000 grams of water at 25 degrees Celsius (° C.). An item or material is "water soluble" if that item or material has a water solubility of about 1 gram or more of that item or material in 1,000 grams of water at 25° C. The term "water soluble" does not specifically indicate a rate of dissolution in water.

In an exemplary embodiment, the unit dose pack 10 is sized to provide a desired quantity of wash composition 20 for one load of laundry or one batch of dishes in a dishwasher. The unit dose pack 10 may also be sized for a fraction of a desired quantity, such as one half of a load of laundry, so a user can adjust the amount of detergent added without having to split a unit dose pack 10. In an exemplary embodiment, the unit dose pack 10 has a weight of from about 5 to about 50 grams. In alternate embodiments, the unit dose pack 10 is from about 10 to about 40 grams, or from about 15 to about 25 grams The cover 12 may be a non-woven fabric with a plurality of fibers, where the fibers are present in a random orientation, or a non-repetitive orientation. In an alternate embodiment, the cover 12 may be woven fabric, where fibers within the cover 12 are oriented in a repetitive manner. In yet other embodiments, the cover 12 may be a film or a substrate that is not formed from a plurality of fibers. The cover 12 has a water solubility of 0.01 grams or less in 1,000 grams of water at 25° C. in one embodiment, but in alternate embodiments the cover has a water solubility of 0.001 grams or less, or 0.0001 grams or less in 1,000 grams of water, at 25° C. The cover 12 is permeable in an exemplary embodiment, so water or other materials may be able to pass through the cover 12. In an embodiment where the cover 12 is a film, the cover 12 may be permeable by osmosis. In other embodiments, the cover 12 is porous, and may also be permeable, so water or other components may be able to pass through the cover 12. In some embodiments, the cover 12 is porous, but the pores are small enough that most materials must be in the liquid state to pass through, such as being dissolved or being a liquid. For example, the pores may have a size of about 1,000 microns or less, or about 100 microns or less, or about 10 microns or less, or about 1 micron or less in various embodiments. However, other pore sizes are possible in alternate embodiments.

The cover 12 may include a wide variety of materials that are non-water soluble, such as polyethylene terephthalate. However, other non-water soluble materials are also possible, including but not limited to polyester, polypropylene, nylon, acetate, latex, cotton, wool, cellulosic materials, silk, rayon, blends, or many other materials. The cover 12 may include a first cover piece 14 and a second cover piece 16, where the first and second cover pieces 14, 16 are stitched together to form a pouch 32 or container to hold the wash composition 20. The cover 12 may include more than 2 pieces in alternate embodiments, and the cover 12 may include only 1 piece in yet other embodiments. The cover 12 may be folded over to form the pouch 32 in embodiments with a single piece. The cover 12 may be a wide variety of shapes, including square, round, rectangular, heart shaped, etc. The first and second cover pieces 14, 16 may have the same shape in some embodiments, but they may have different shapes in alternate embodiments.

The thread 30 is water soluble, so the thread 30 has a solubility of about 1 gram or more in 1,000 grams of water at 25° C. However, in alternate embodiments, the thread 30 may have a solubility of about 10 grams or more, or about 100 grams or more, in 1,000 grams of water at 25° C. The cover 12 is stitched together to form a pouch 32 with the thread 30, where a wide variety of stitching techniques may be used. The thread 30 may be stitched in a straight pattern, a zig zag pattern, an overlocking pattern, a decorative pattern, or many other patterns in various embodiments. In an exemplary embodiment, the thread 30 is stitched in a pattern that retains solids within the pouch 32. For example, the spacing between stitches of the thread 30 may be smaller than the solids within the pouch 32. In an exemplary embodiment, the stitches are spaced about 3 millimeters (mm) or less apart, but in alternate embodiments the stitching may be 1 mm or less, or 0.5 mm or less. Alternate stitch spacing is possible in other embodiments. The stitching may form a single pouch 32, as illustrated, but in alternate embodiments the stitching may form a plurality of pouches 32.

The size of the thread 30 may be adjusted as desired to better control the release time of the wash composition 20 in an aqueous medium. For example, if a slower release time is desired, thicker thread 30 may be used such that more time is required for the thread 30 to dissolve and release the wash composition 20. Thinner thread 30 may speed the release time relative to thicker thread 30. In an exemplary embodiment, the thread 30 may be from about 0.01 to about 50 mm thick, but in alternate embodiments the thread 30 may be from about 0.05 to about 20 mm thick, or from about 0.1 to about 10 mm thick, but other thicknesses are also possible. It is also possible to utilize a plurality of different threads 30 in a unit dose pack 10. For example, a unit dose pack 10 with two pouches 32 may have a thinner thread for one pouch 32 and a thicker thread for the other pouch 32, so the pouches release at different times. The cover 12 may also be porous and/or permeable, so some of the wash composition 20 may be released through the cover 12 prior to dissolution of the thread 30, as mentioned above.

A wide variety of water soluble materials may be utilized for the thread 30, and the thread 30 may include a blend or combination of materials in some embodiments. The thread 30 may be single strand, or it may include a plurality of strands that are randomly grouped or grouped in a weave, twist, or other repeating pattern. Each strand of the thread 30 may include a plurality of materials, but in alternate embodiments different strands of a multi-strand thread 30 may be formed from different materials. In some embodiments, all the strands (even if there is only one strand) are formed from the same material. In an exemplary embodiment, the thread 30 includes polyvinyl alcohol, polyvinyl acetate, or other water soluble materials, or combinations thereof.

Figure 2:
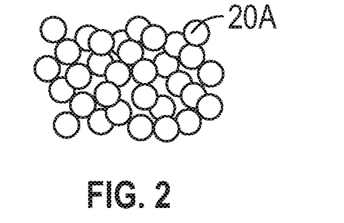
FIGS. 2 and 3 are exemplary embodiments of a wash composition.
Figure 3:
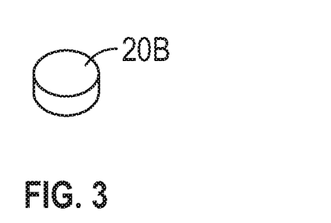

The unit dose pack 10 is formed by encapsulating the wash composition 20 within the pouch 32 formed by stitching the cover 12 with the thread 30. In an exemplary embodiment, the wash composition 20 is a solid material, and may be in a wide variety of forms such as a powder, a block, pellets, pastilles, a dust, or other forms. Different possible forms of the wash composition 20 are illustrated in FIGS. 2 and 3, with continuing reference to FIG. 1. FIG. 2 illustrates the wash composition 20A in a pellet form, and FIG. 2 illustrates the wash composition 20B in a disc form, but other forms are also possible. The wash composition 20 may be pressed into a solid block, disc, or other shape, or it may be cast as a solid block or disc, or it may be provided in other manners or shapes in various embodiments. The wash composition 20, 20A, 20B is water soluble, so the wash composition 20, 20A, 20B will dissolve into the wash water in a washing machine.

Figure 4:
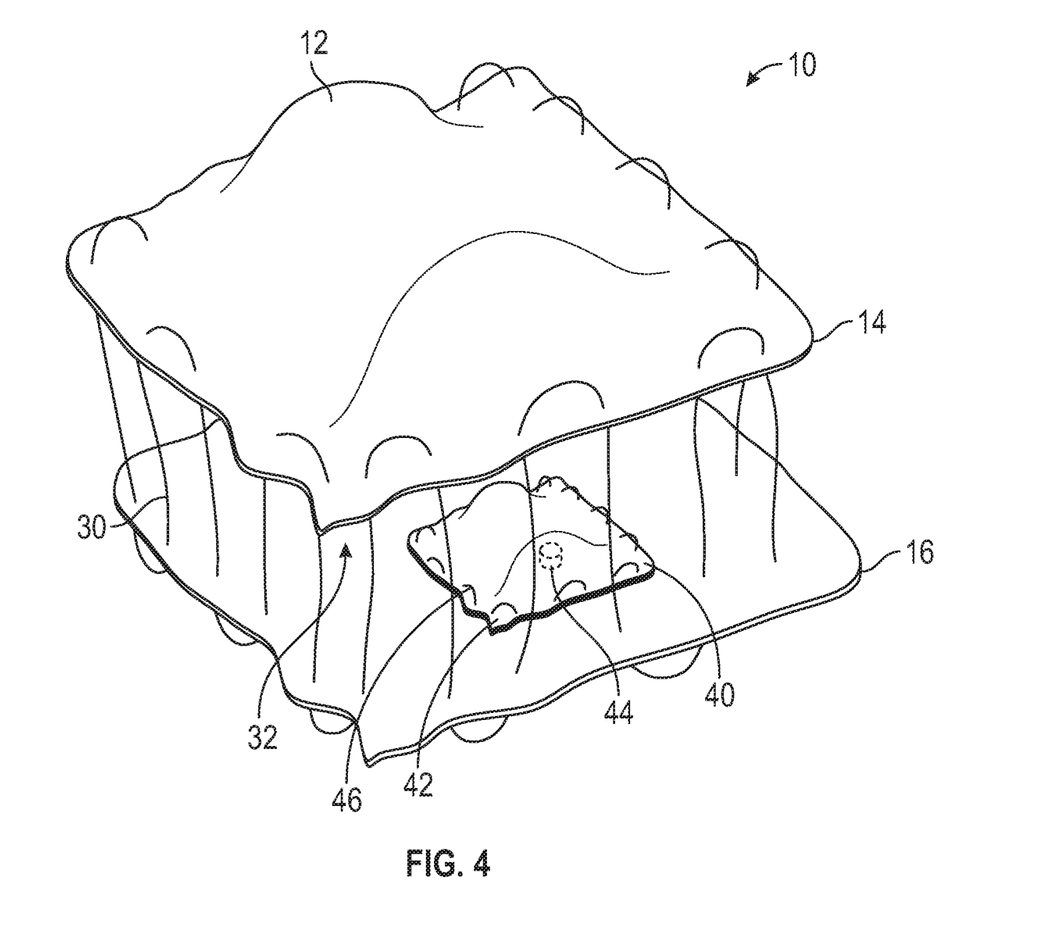
FIG. 4 is an exploded perspective view of another embodiment of a unit dose pack.

An alternative embodiment is illustrated in FIG. 4, with continuing reference to FIGS. 1-3, where an inner satchel 40 is positioned within the pouch 32. The inner satchel 40 may be free floating within the pouch 32, or the inner satchel 40 may be stitched or otherwise affixed within the pouch in various embodiments. The inner satchel 40 is formed from an inner satchel fabric 42 with an inner satchel compound 44 within the inner satchel 40. The inner satchel compound 44 is illustrated within the inner satchel 40 for illustration purposes in FIG. 4. In an exemplary embodiment, the inner satchel 40 is formed by stitching the inner satchel fabric 42 with an inner satchel thread 46, but other embodiments are also possible. In an exemplary embodiment, the inner satchel fabric 42 is non-water soluble, and the inner satchel thread 46 is water soluble, but other embodiments are also possible.

The inner satchel compound 44 may be different than the wash composition 20. For example, the inner satchel compound 44 may be a laudering additive such as a fabric softener for the washing machine, and the inner satchel thread 46 may be configured to dissolve and release the inner satchel compound 44 later than the wash composition 20. As such, the inner satchel 40 may be utilized within the unit dose pack 10 such that the wash composition 20 is released early in a wash cycle for cleaning cloths, and the inner satchel compound 44 is be released later in the wash cycle to provide a fabric softening feature with a single product. Alternative embodiments are also possible, where different types of wash compositions 20 are released at different portions of the wash cycle, or a second dose of the same wash composition 20 may be release at different portions of the wash cycle, etc. The inner satchel compound 44 may be the same or different from the wash composition 20.

In yet another embodiment, a laundering additive (not illustrated) may be applied into the cover 12. The laundering additive may be non-water soluble so as to pass through the wash cycle at least partially in tack. The laundering additive may then be released within a dryer by the heat associated with drying. In an exemplary embodiment, the laundering additive includes one or more of a dryer activated fabric softener, a fragrance for the dryer, and/or a carrier, but other embodiments are also possible. For example, the laundering additive may include a washing machine activated fabric softener or a washing machine activated fragrance. As such, the fabric softener, the fragrance, and/or the carrier may be non-water soluble. The use of a non-water soluble laundering additive applied onto the cover 12 may provide a dual benefit for a consumer, because the same unit dose pack 10 provides the wash composition 20 for washing cloths and the laundering additive for the dryer.

The laundering additive may be applied to the cover 12 by being passed over a rotogravure applicator roll. In its passage over this roll, the cover 12 is coated with a thin, uniform layer of molten laundering additive that may be supplied from a storage container, and the laundering additive may be applied onto the cover 12 at from about 1 to about 50 grams per square yard. However, different application amounts are also possible. The cover 12 is then cooled to solidify the molten laundering additive. Other techniques for applying the laundering additive to the cover 12 are also possible. In some embodiments, application of the laundering additive to the cover 12 may result in the laundering additive being impregnated into the cover 12. In alternate embodiments, the laundering additive may be coated or otherwise affixed onto the cover 12.

In an exemplary embodiment, the laundering additive includes one or more of several possible components. Possible components that may be included in the laundering additive include fabric softeners for the washing machine or for the dryer, fragrance for the washing machine or for the dryer, etc. Exemplary components include: cationic quaternary ammonium salts; tertiary fatty amines; carboxylic acids having 8 to 30 carbon atoms and one carboxylic group per molecule; esters of polyhydric alcohols; fatty alcohols; ethoxylated fatty alcohols; alkylphenols; ethoxylated alkylphenols; ethoxylated fatty amines; ethoxylated monoglycerides; ethoxylated diglycerides; mineral oils; fragrance; and polyols. The laundering additive may also include a carrier or other components as desired.

In an exemplary embodiment, cationic quaternary ammonium salts may be included in the laundering additive as a fabric softener. The counterion may be methyl sulfate or any halide. Examples of cationic quaternary ammonium salts include, but are not limited to: acyclic quaternary ammonium salts having at least two $C_{8-30}$, such as: ditallowdimethyl ammonium methylsulfate, di(hydrogenated tallow) dimethyl ammonium methylsulfate, distearyldimethyl ammonium methylsulfate, dicocodimethyl ammonium methylsulfate and the like; cyclic quaternary ammonium salts of the imidazolinium type such as di(hydrogenated tallow)dimethyl imidazolinium methylsulfate, 1-ethylene-bis(2-tallow-1-methyl) imidazolinium methylsulfate and the like; Diamido quaternary ammonium salts such as: methyl-bis(hydrogenated tallow amidoethyl)-2-hydroxyethyl ammonium methyl sulfate, methyl bis(tallowamidoethyl)-2-hydroxypropyl ammonium methylsulfate and the like; and Biodegradable quaternary ammonium salts such as N,N-di(tallowoyl-oxy-ethyl)-N,N,-dimethyl ammonium methyl sulfate and N,N-di(tallowoyl-oxy-propyl)-N,N-dimethyl ammonium methyl sulfate.

The tertiary fatty amines that may be employed as fabric softeners may include alkyl chains, such as one or more alkyl chains having 8 to 30 carbons atoms. Examples include hardened tallow amine and cyclic amines such as 1-(hydrogenated tallow) amidoethyl-2-(hydrogenated tallow) imidazoline. As mentioned above, the laundering additive may include carboxylic acids having 8 to 30 carbon atoms and one carboxylic group per molecule. The alkyl portion of the carboxylic acid may include has 8 to 30 carbon atoms, and may be linear or branched, saturated or unsaturated. One example of such a carboxylic acid is stearic. Esters of polyhydric alcohols may include sorbitan esters or glycerol stearate.

A wide variety of fragrances may be utilized in the laundering additive and/or in the wash composition 20. The term "fragrance," as used herein, means an odoriferous material or any material which acts as a malodor counteractant. A fragrance is generally characterized by a vapor pressure greater than atmospheric pressure at ambient temperature, such as at 25° C. The fragrance may be a liquid at 25° C., but some fragrances are solids. For example, various camphoraceous fragrances that are solid are available. A wide variety of chemicals are known for fragrance purposes, including but not limited to materials such as aldehydes, ketones, and esters. Many naturally occurring plant and animal oils and exudates comprise complex mixtures of various chemical components and are known for use as fragrances and may be utilized herein.

The fabric softener and/or the fragrance may be combined with a carrier, where the carrier keeps other components in a solid state that is non-water soluble. As such, liquid fabric softeners and/or fragrances may be utilized with an appropriate carrier. Exemplary non-water soluble carriers include waxes and non-water soluble polymers, but other materials may also be used. Exemplary non-water soluble polymers that may be utilized as the carrier include polyethylenes, polyamides, polystyrenes, polyisoprenes, polycarbonates, polyesters, polyacrylates, vinyl polymers and polyurethanes and mixtures thereof, which have a number average molecule weight of from about 100 to about 30,000, and a melting point of from about 35° C. to about 190° C. The carrier may be utilized for the fabric softener alone, the fragrance alone, or a combination thereof. In an alternate embodiment, a different type of laundering additive may be mixed with the carrier, such as an anti-static compound for the dryer or other additives for either the dryer or the washing machine. In various embodiments, the carrier and other components for the dryer may be applied onto the cover 12 or utilized for the inner satchel compound 44, or both.

A plurality of components are combined to form the wash composition 20, where the wash composition 20 is typically prepared prior to encapsulation within the pouch 32. A total weight of the wash composition 20 does not include the weight of the cover 12 or the thread 30, or the optional inner satchel 40. The total weight of the wash composition 20 is generally referenced herein as the basis for the weight percent of components of the wash composition 20. Unless otherwise specified, the concentration of all components or the wash composition 20 is the weight percent of the named component based on the total weight of the wash composition 20.

The wash composition 20 may include water, where the water may be bound to other components and/or be free. Water may be present in the wash composition 20 at a concentration of from about 0 to about 10 weight percent, or present in an amount of from about 0 to about 8 weight percent, or present in an amount of from about 0 to about 5 weight percent in various embodiments, based on the total weight of the wash composition 20. Other non-aqueous solvents may also be present in the wash composition 20, such as glycerin, polyethylene glycol, ethanol, etc.

The wash composition 20 may include one or more ionic surfactants, where the ionic surfactant is formulated for laundry in an exemplary embodiment. The ionic surfactant may include one or more surfactants, including cationic and/or anionic surfactants, in various embodiments. The ionic surfactant may be present in the wash composition 20 at a concentration of from about 5 to about 80 weight percent in one embodiment, but the ionic surfactant may be present in the wash composition 20 at a concentration of about 5 to about 60 weight percent, or from about 10 to about 50 weight percent in alternate embodiments, based on a total weight of the wash composition 20. The one or more ionic surfactants are water soluble.

Suitable ionic surfactants that are anionic include soaps which contain sulfate or sulfonate groups, including those with alkali metal ions as cations. Usable soaps include alkali metal salts, amine salts, or other salts of saturated or unsaturated fatty acids with 12 to 18 carbon (C) atoms. Such fatty acids may also be used in incompletely neutralized form, such that some of the fatty acids are present in a salt form and other fatty acids are present in a free acid form where an acid group is protonated. Usable ionic surfactants of the sulfate type include sulfuric acid semi esters of fatty alcohols with 12 to 18 C atoms, and/or alcohol ethoxysulfates, where these compounds may be present in a salt form. Usable ionic surfactants of the sulfonate type include alkane sulfonates with 12 to 18 C atoms and olefin sulfonates with 12 to 18 C atoms, such as those that arise from the reaction of corresponding mono-olefins with sulfur trioxide. Another type of sulfonate surfactant includes alpha-sulfofatty acid esters such as those that arise from the sulfonation of fatty acid methyl or ethyl esters, and lauryl ether sulfates.

In an exemplary embodiment, the wash composition 20 includes linear alkyl benzene sulfonic acid surfactants as the ionic surfactant at a concentration of from about 1 to about 15 weight percent, or from about 2 to about 12 weight percent, or from about 4 to about 8 weight percent in different embodiments. In an exemplary embodiment, linear alkylbenzene sulfonates include 9 to 14 C atoms in the alkyl moiety. In alternate embodiments, the wash composition 20 is free of linear alkyl benzene sulfonic acid surfactants. As used herein, "free of" means the named component is present in an amount of about 1 weight percent or less, based on a total weight of the named composition (such as the wash composition 20), unless otherwise specified.

Suitable ionic surfactants that are cationic may include textile-softening substances of the general formula X, XI, or XII as illustrated below:

in which each $R^1$ group is mutually independently selected from among $C_{1-6}$ alkyl, alkenyl or hydroxyalkyl groups; each $R^2$ group is mutually independently selected from among $C_{8-28}$ alkyl or alkenyl groups; $R^3=R^1$ or $(CH_2)_n$-T-$R^2$; $R^4=R^1$ or $R^2$ or $(CH_2)_n$-T-$R^2$; T=—$CH_2$—, —O—CO—, or —CO—O—, and n is an integer from 0 to 5. The ionic surfactants that are cationic may include conventional anions of a nature and number required for charge balancing. Alternatively, the ionic surfactant may include anionic surfactants that may function to balance the charges with the cationic surfactants. In some embodiments, ionic surfactants that are cations may include hydroxyalkyltrialkylammonium compounds, such as $C_{12-18}$ alkyl(hydroxyethyl)dimethyl ammonium compounds, and may include the halides thereof, such as chlorides or other halides. The ionic surfactants that are cations may be especially useful for compositions intended for treating textiles.

Nonionic surfactants may optionally be present in the wash composition 20 at a concentration of from about 0 to about 80 weight percent, or from about 5 to about 60 weight percent, or from about 10 to about 50 weight percent in various embodiments, based on the total weight of the wash composition 20. Suitable nonionic surfactants include alkyl glycosides and ethoxylation and/or propoxylation products of alkyl glycosides or linear or branched alcohols in each case having 12 to 18 C atoms in the alkyl moiety and 3 to 20, or 4 to 10, alkyl ether groups. Corresponding ethoxylation and/or propoxylation products of N-alkylamines, vicinal diols, fatty acid esters and fatty acid amides, which correspond to the alkyl moiety in the stated long-chain alcohol derivatives, may furthermore be used. Alkylphenols having 5 to 12 C atoms may also be used in the alkyl moiety of the above described long-chain alcohol derivatives. The nonionic surfactants are also water soluble.

Other optional components may be included in the wash composition 20, such as water-binding saccharides, enzymes, peroxy compounds, bleach activators, anti-redeposition agents, pH adjusting agents, optical brighteners, foam inhibitors, bittering agents, dye transfer inhibitors, soil release agents, and other components. A partial, non-exclusive list of additional components that may be added to and included in the wash composition 20 includes electrolytes, pH regulators, graying inhibitors, anti-crease components, processing aids, antimicrobial agents, and preservatives.

Water binding saccharides are optionally included in the wash composition 20. In some embodiments, the saccharide is selected from the group of fructose, glucose, sucrose, xylitol, sorbitol, mannitol, erythritol, dulcitol, inositol, adonitol, tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, amylopectin, glucosamine, mannosamine, fucose, glucuronic acid, gluconic acid, gluconolactone, abequose, galactosamine, beet oligosaccharides, isomalto-oligosaccharides, xylo-oligosaccharides, gentiooligoscaccharides, sorbose, nigero-oligosaccharides, palatinose oligosaccharides, fucose, fractooligosaccharides, maltotetraol, maltotriol, malto-oligosaccharides, lactulose, melibiose, raffinose, rhamnose, ribose, high fructose corn/starch syrup, coupling sugars, soybean oligosaccharides, or glucose syrup, and mixtures thereof.

One example of a saccharide that may be utilized is high fructose corn syrup (HFCS.) HFCS typically refers to a blend of approximately 23% water and 77% saccharide. For example, HFCS 55 typically refers to a blend of water (about 23%), glucose (about 34%), and fructose (about 42%). However, in a dried form, HFCS 55 contains approximately 55% fructose by weight of dry HFCS, where the number after the abbreviation HFCS generally refers to the percentage of fructose in a dry state. Unless otherwise stated, HFCS used herein refers to a wet blend which contains water, as it is supplied from HFCS manufacturers. However, it should be understood that dry or essentially dry hybrids of monosaccharides (e.g. HFCS), wherein water has been removed partially or completely, can also be used. Other HFCS products may also be used, such as HFCS 42, HFCS 65, HFCS 90, and others. While pure fructose is very viscous and hard to handle, HFCS is more dilute and easier to handle. HFCS is also more cost-effective to manufacture. The United States Food and Drug Administration has even determined that HFCS is a safe ingredient for food and beverage manufacturing. It is certainly a safe and green ingredient for detergent products.

Foam inhibitors may optionally be included in the wash composition 20. Suitable foam inhibitors include, but are not limited to, soaps of natural or synthetic origin, which include an elevated proportion of $C_{18}$-$C_{24}$ fatty acids. Suitable non-surfactant foam inhibitors are, for example, organopolysiloxanes and mixtures thereof with microfine, optionally silanized silica as well as paraffins, waxes, microcrystalline waxes and mixtures thereof with silanized silica or bis-fatty acid alkylenediamides. Mixtures of different foam inhibitors may also be used, for example mixtures of silicones, paraffins or waxes. In an exemplary embodiment, coconut fatty acids are used as foam inhibitors, but other embodiments are possible, such as mixtures of paraffins and bistearylethylenediamide. The wash composition 20 may include the foam inhibitor at an amount of from about 0 to about 20 weight percent, but in other embodiments the foam inhibitor may be present at an amount of from about 0.05 to about 15 weight percent, or an amount of from about 0.5 to about 10 weight percent, based on the total weight of the wash composition 20.

pH adjusting agents may be added to and included in the wash composition 20. The wash composition 20 is a solid in some embodiments, so pH adjusting agents are utilized to adjust the pH of an aqueous solution after the wash composition 20 has dissolved or dispersed into that aqueous solution. Exemplary pH adjusting agents include monoethanol amine, binary amines, buffers, triethanol amine, metal hydroxides, or other materials. Exemplary metal hydroxides are sodium hydroxide and/or potassium hydroxide, and other possible pH adjusting agents include compounds that adjust the pH of the wash composition 20. pH adjusting agents may be present in the wash composition 20 at an amount of from about 0.1 to about 15 weight percent in some embodiments, based on the total weight of the wash composition 20, but in other embodiments the pH adjusting agent may be present in the wash composition 20 at an amount of from about 0.5 to about 10 weight percent, or an amount of from about 1 to about 5 weight percent, based on the total weight of the wash composition 20. The pH adjusting agent may be utilized to adjust the pH of the wash composition 20 to from about 6 to about 10, or from about 6.5 to about 9.5, or from about 7 to about 9 in various embodiments. The pH adjusting agent may form a cation that combines with an anionic surfactant and/or a coconut fatty acid or other foam inhibitor and/or another anionic component within the wash composition 20. In many cases, the pH adjusting agent forms a salt with an anionic component. As such, the anionic surfactant may be present in the wash composition 20 as a surfactant salt, and the coconut fatty acid may be present in the wash composition 20 as a coconut fatty acid salt. In some embodiments, the pH adjusting agent is included in a slight excess relative to the anionic surfactant or other acidic components to adjust the pH of the wash composition 20 to within a desired range, such as the range(s) mentioned above. As used herein, the terms "anionic surfactant" and "coconut fatty acid" include the neutralization products thereof.

Possible enzymes that may be in the wash composition 20 contemplated herein include one or more of a protease, lipase, cutinase, amylase, carbohydrase, cellulase, pectinase, mannanase, arabinase, galactanase, xylanase, oxidase, (e.g., a laccase), and/or peroxidase, but others are also possible. In general, the properties of the selected enzyme(s) should be compatible with the selected wash composition 20, (i.e., pH-optimum, compatibility with other enzymatic and non-enzymatic ingredients, etc.). The detergent enzyme(s) may be included in the wash composition 20 by adding separate additives containing one or more enzymes, or by adding a combined additive comprising all the enzymes that are added to the wash composition 20. The enzyme(s) should be present in the wash composition 20 in effective amounts, such as from about 0 weight percent to about 10 weight percent of enzyme, or from about 0.001 to about 7 weight percent, or from about 0.2 to about 4 weight percent, or from about 0.5 to about 4 weight percent, based on the total weight of the wash composition 20, in various embodiments. In an exemplary embodiment, the wash composition 20 includes three or more different enzymes. In one embodiment, the wash composition 20 includes protease, mannanase, and amylase, but other embodiments are also possible.

A peroxy compound may optionally be present in the wash composition 20. Exemplary peroxy compounds include organic peracids or peracidic salts of organic acids, such as phthalimidopercaproic acid, perbenzoic acid or salts of diperdodecanedioic acid, hydrogen peroxide and inorganic salts that release hydrogen peroxide under the washing conditions, such as perborate, percarbonate and/or persilicate. Hydrogen peroxide may also be produced with the assistance of an enzymatic system, i.e. an oxidase and its substrate. Other possible peroxy compounds include alkali metal percarbonates, alkali metal perborate monohydrates, alkali metal perborate tetrahydrates or hydrogen peroxide. Peroxy compounds may be present in the wash composition 20 at an amount of from about 0 to about 20 weight percent, or an amount of from about 1 to about 15 weight percent, or an amount of from about 3 to about 10 weight percent, based on the total weight of the wash composition 20, in various embodiments.

Bleach activators may optionally be added and included in the wash composition 20. Conventional bleach activators that form peroxycarboxylic acid or peroxyimidic acids under perhydrolysis conditions and/or conventional bleach-activating transition metal complexes may be used. The bleach activator optionally present may include, but is not limited to, one or more of: N- or O-acyl compounds, for example polyacylated alkylenediamines, such as tetraacetylethylenediamine; acylated glycolurils, such as tetraacetylglycoluril; N-acylated hydantoins; hydrazides; triazoles; urazoles; diketo-piperazines; sulfurylamides and cyanurates; carboxylic anhydrides, such as phthalic anhydride; carboxylic acid esters, such as sodium isononanoylphenolsulfonate; acylated sugar derivatives, such as pentaacetyl glucose; and cationic nitrile derivatives such as trimethylammonium acetonitrile salts.

To avoid interaction with peroxy compounds during storage, the bleach activators may be coated with shell substances or granulated prior to addition to the wash composition 20, in a known manner. Exemplary embodiments of the coating or shell substance include tetraacetylethylenediamine granulated with the assistance of carboxymethylcellulose and having an average grain size of 0.01 mm to 0.8 mm, granulated 1,5-diacetyl-2,4-dioxohexahydro-1,3,5-triazine, and/or trialkylammonium acetonitrile formulated in particulate form. In alternate embodiments, the peroxy compounds and bleach activators, if present, may be within separate chambers of the container to prevent premature interactions. For example, the bleach activator may be a component of the inner satchel compound. In various embodiments, the bleach activators may be present in the wash composition 20 in quantities of from about 0 to about 10 weight percent, or from about 0 to about 8 weight percent, or from about 0 to about 5 weight percent, in each case relative to the total weight of the wash composition 20.

One or more anti-redeposition agents may also be optionally included in the wash composition 20. Anti-redeposition agents include polymers with a soil detachment capacity, which are also known as "soil repellents" due to their ability to provide a soil-repelling finish on the treated surface, such as a fiber. One example regarding polyesters includes copolyesters prepared from dicarboxylic acids, such as adipic acid, phthalic acid or terephthalic acid. In an exemplary embodiment, an anti-redeposition agents includes polyesters with a soil detachment capacity that include those compounds which, in formal terms, are obtainable by esterifying two monomer moieties, the first monomer being a dicarboxylic acid HOOC-Ph-COOH and the second monomer a diol HO—$(CHR^{11}$—$)_a$OH, which may also be present as a polymeric diol H—$(O$—$(CHR^{11}$—$)_a)_b$OH. Ph here means an ortho-, meta- or para-phenylene residue that may bear 1 to 4 substituents selected from alkyl residues with 1 to 22 C atoms, sulfonic acid groups, carboxyl groups and mixtures thereof. $R^{11}$ means hydrogen or an alkyl residue with 1 to 22 C atoms and mixtures thereof. "a" means a number from 2 to 6 and "b" means a number from 1 to 300. The polyesters obtainable therefrom may contain not only monomer diol units —O—$(CHR^{11}$—$)_a$O— but also polymer diol units —$(O$—$(CHR^{11}$—$)_a)_b$O—. The molar ratio of monomer diol units to polymer diol units may amount to from about 100:1 to about 1:100, or from about 10:1 to about 1:10 in another embodiment. In the polymer diol units, the degree of polymerization "b" may be in the range of from about 4 to about 200, or from about 12 to about 140 in an alternate embodiment. The number average molecular weight of the polyesters with a soil detachment capacity may be in the range of from about 250 to about 100,000, or from about 500 to about 50,000 in an alternate embodiment. The acid on which the residue Ph is based may be selected from terephthalic acid, isophthalic acid, phthalic acid, trimellitic acid, mellitic acid, the isomers of sulfophthalic acid, sulfoisophthalic acid and sulfoterephthalic acid and mixtures thereof. Where the acid groups thereof are not part of the ester bond in the polymer, they may be present in salt form, such as an alkali metal or ammonium salt. Exemplary embodiments include sodium and potassium salts.

If desired, instead of the monomer HOOC-Ph-COOH, the polyester with a soil detachment capacity (the anti-redeposition agent) may include small proportions, such as no more than about 10 mole percent relative to the proportion of Ph with the above-stated meaning, of other acids that include at least two carboxyl groups. These include, for example, alkylene and alkenylene dicarboxylic acids such as malonic acid, succinic acid, fumaric acid, maleic acid, glutaric acid, adipic acid, pimelic acid, suberic acid, azelaic acid and sebacic acid. Exemplary diols HO—$(CHR^{11}$—$)_a$OH include those in which $R^{11}$ is hydrogen and "a" is a number of from about 2 to about 6, and in another embodiment includes those in which "a" has the value of 2 and $R^{11}$ is selected from hydrogen and alkyl residues with 1 to 10 C atoms, or where $R^{11}$ is selected from hydrogen and alkyl residues with 1 to 3 C atoms in another embodiment. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. The polymeric diols include polyethylene glycol with a number average molar mass in the range from about 1000 to about 6000. If desired, these polyesters may also be end group-terminated, with end groups that may be alkyl groups with 1 to 22 C atoms or esters of monocarboxylic acids. The end groups attached via ester bonds may be based on alkyl, alkenyl and aryl monocarboxylic acids with 5 to 32 C atoms, or with 5 to 18 C atoms in another embodiment. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselinic acid, petroselaidic acid, oleic acid, linoleic acid, linolaidic acid, linolenic acid, eleostearic acid, arachidic acid, gadoleic acid, arachidonic acid, behenic acid, erucic acid, brassidic acid, clupanodonic acid, lignoceric acid, cerotic acid, melissic acid, and benzoic acid. These end groups may bear 1 to 5 substituents having a total of up to 25 C atoms, or 1 to 12 C atoms in another embodiment, for example tert-butylbenzoic acid. The end groups may also be based on hydroxymonocarboxylic acids with 5 to 22 C atoms, which for example include hydroxyvaleric acid, hydroxycaproic acid, ricinoleic acid, hydrogenation products thereof, hydroxystearic acid, and ortho-, meta- and para-hydroxybenzoic acid. The hydroxymonocarboxylic acids may in turn be joined to one another via their hydroxyl group and their carboxyl group and thus be repeatedly present in an end group. The number of hydroxymonocarboxylic acid units per end group, i.e. their degree of oligomerization, may be in the range of from 1 to 50, or in the range of from 1 to 10 in another embodiment. In an exemplary embodiment, polymers of ethylene terephthalate and polyethylene oxide terephthalate, in which the polyethylene glycol units have molar weights of from about 750 to about 5000 and the molar ratio of ethylene terephthalate to polyethylene oxide terephthalate of from about 50:50 to about 90:10, are used alone or in combination with cellulose derivatives. The anti-redeposition agent is present in the wash composition 20 at an amount of from about 0 to about 7 weight percent, or an amount of from about 0 to about 5 weight percent, or an amount of from about 0 to about 4 weight percent, based on the total weight of the wash composition 20, in various embodiments.

Optical brighteners may optionally be included in the wash composition 20. Optical brighteners adsorb ultraviolet and/or violet light and re-transmit it as visible light, typically a visible blue light. Optical brighteners include, but are not limited to, derivatives of diaminostilbene disulfonic acid or the alkali metal salts thereof. Suitable compounds are, for example, salts of 4,4'-bis(2-anilino-4-morpholino-1,3,5-triazinyl-6-amino)stilbene 2,2'-disulfonic acid or compounds of similar structure which, instead of the morpholino group, bear a diethanolamino group, a methylamino group, an anilino group or a 2-methoxyethylamino group. Optical brighteners of the substituted diphenylstyryl type may furthermore be present, such as the alkali metal salts of 4,4'-bis(2-sulfostyryl)diphenyl, 4,4'-bis(4-chloro-3-sulfostyryl)diphenyl, or 4-(4-chlorostyryl)-4'-(2-sulfostyryl) diphenyl. Mixtures of the above-stated optical brighteners may also be used. Optical brighteners may be present in the wash composition 20 at an amount of from about 0 to about 7 weight percent in some embodiments, but in other embodiments optical brighteners are present in an amount of from about 0.005 to about 6 weight percent, or an amount of from about 0.01 to about 1 weight percent, based on the total weight of the wash composition 20.

Bittering agents may optionally be added to hinder accidental ingestion of the unit dose pack 10 or the wash composition 20. Bittering agents are compositions that taste bad, so children or others are discouraged from accidental ingestion. Exemplary bittering agents include denatonium benzoate, aloin, and others. Bittering agents may be present in the wash composition 20 at an amount of from about 0 to about 1 weight percent, or an amount of from about 0 to about 0.5 weight percent, or an amount of from about 0 to about 0.1 weight percent in various embodiments, based on the total weight of the wash composition 20.

The wash composition 20 may optionally include sodium sulfite. Sodium sulfite is an oxygen scavenger, where sodium sulfite reacts with oxygen to form sodium sulfate. Free oxygen, such as oxygen dissolved in the wash composition 20, can react to produce metal oxides (rust) that reduce the life of the washing equipment. The metal oxides can also stain garments, dishes, or other items being washed. In various embodiments, the sodium sulfite is present in the wash composition 20 at a concentration of from about 0.05 to about 5 weight percent, or from about 0.05 to about 4 weight percent, or from about 0.05 to about 3 weight percent, all based on the total weight of the wash composition 20.

One or more chelating compounds may optionally be present in the wash composition 20 at an amount of from about 0.01 to about 2 weight percent in an exemplary embodiment, but in alternate embodiments the chelating compound is present at an amount of from about 0.035 to about 1.5 weight percent, or an amount of from about 0.05 to about 1 weight percent, based on the total weight of the wash composition 20. Chelating compounds are sometimes referred to as water softeners. Many compounds can be used as chelating compounds, including but not limited to iminodisuccinate (IDS), ethylenediaminetetraacetic acid (EDTA), nitrilotriacetic acid, diethylenetriaminepenta (methylenephosphonic acid), nitrilotris(methylenephosphonic acid), 1-hydroxyethane-1,1-diphosphonic acid, ethylenediamine-N,N'-disuccinic acid (EDDS), hydroxyethylenediaminetriacetic acid (HEDTA), or other chelating compounds.

The wash composition 20 may be prepared by combining and mixing the components of the wash composition 20 with a mixer. Once mixed, the wash composition 20 is encapsulated in the pouch 32. In an exemplary embodiment, the wash composition 20 may be dried or formed or compacted into a desired shape prior to encapsulation. The components of the wash composition 20 may all be mixed at one time, or different components may be pre-mixed and then combined. A wide variety of mixers may be used in alternate embodiments, such as an agitator, an in-line mixer, a ribbon blender, an emulsifier, and others. The cover 12 is stitched together with the thread 30 to encapsulate the wash composition 20 within the pouch 32.

Another exemplary embodiment contemplated herein is directed to the use of a unit dose pack 10 as described above in laundry cleaning process. In particular, an embodiment is directed to the use of a unit dose pack 10 in laundering of textile and fabrics, such as house hold laundry washing and industrial laundry washing. The fabrics and/or garments subjected to a washing, cleaning or textile care process contemplated herein may be conventional washable laundry, such as household laundry. In some embodiments, the major part of the laundry is garments and fabrics, including but not limited to knits, woven fabrics, denims, non-woven fabrics, felts, yarns, and toweling. The fabrics may be cellulose based, such as natural cellulosics, including cotton, flax, linen, jute, ramie, sisal or coir or manmade cellulosics (e.g., originating from wood pulp) including viscose/rayon, ramie, cellulose acetate fibers (tricell), lyocell or blends thereof. The fabrics may also be non-cellulose based such as natural polyamides including wool, camel, cashmere, mohair, rabbit, and silk, or the fabric may be a synthetic polymer such as nylon, aramid, polyester, acrylic, polypropylene and spandex/elastin, or blends of any of the above-mentioned products. Examples of blends are blends of cotton and/or rayon/viscose with one or more companion material such as wool, synthetic fibers (e.g., polyamide fibers, acrylic fibers, polyester fibers, polyvinyl alcohol fibers, polyvinyl chloride fibers, polyurethane fibers, polyurea fibers, aramid fibers), and cellulose-containing fibers (e.g., rayon/viscose, ramie, flax, linen, jute, cellulose acetate fibers, lyocell).

In one embodiment, the fabrics and/or garments are added to a washing machine, and the unit dose pack 10 is also added to the washing machine before wash water is added. In an alternate embodiment, the unit dose pack 10 is manually added to the fabrics and/or garments with the wash water after the washing process has started. The thread 30 dissolves and releases the wash composition 20 into the aqueous wash water. The thread 30 is dissolved and washes out of the washing machine with the excess wash water, and the cover 12 is transferred to a dryer with the fabrics and/or garments. The fabrics and/or garments may then be dried and processed as normal. The laundering additive may be released into the dryer from the cover 12 in some embodiments, so the unit dose pack 10 may provide a benefit in both the washing machine and the dryer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A unit dose pack comprising:
a cover that is non-water soluble;
a wash composition encapsulated within the cover to form the unit dose pack, wherein the wash composition is a solid; and
a thread that is water soluble, wherein the cover is stitched together with the thread to form a pouch around the wash composition;
an inner satchel positioned within the pouch, wherein the inner satchel comprises an inner satchel fabric and an inner satchel compound which is different from the wash composition;
wherein the inner satchel fabric is fastened together with an inner satchel thread, wherein the inner satchel fabric is fastened around the inner satchel compound, and wherein the inner satchel thread is water soluble.

2. The unit dose pack of claim 1 wherein:
the thread comprises polyvinyl alcohol.

3. The unit dose pack of claim 1 wherein:
the cover is a non-woven fabric, wherein the cover comprises a plurality of fibers.

4. The unit dose pack of claim 1 wherein:
the cover is permeable.

5. The unit dose pack of claim 1 wherein:
the wash composition is a powder.

6. The unit dose pack of claim 1 wherein:
the wash composition is in the form of a disc.

7. The unit dose pack of claim 1 wherein:
the wash composition comprises a surfactant.

8. The unit dose pack of claim 1 wherein:
the wash composition comprises a surfactant, an enzyme, an optical brightener, and a soil anti-redeposition agent.

9. The unit dose pack of claim 1 wherein:
the cover is porous.

10. The unit dose pack of claim 1 wherein the cover comprises polyethylene terephthalate.

11. The unit dose pack of claim 1 further comprising:
a fabric softener, wherein the fabric softener is applied onto the cover.

12. The unit dose pack of claim 11 wherein the fabric softener is non-water soluble.

13. The unit dose pack of claim 1 further comprising:
a fragrance applied onto the cover.

14. A unit dose pack comprising:
a cover comprising that is non-water soluble;
a wash composition encapsulated within the cover to form the unit dose pack, wherein the wash composition comprises a surfactant;
a thread that is water soluble, wherein the cover is stitched together to form a pouch around the wash composition;
a laundering additive applied onto the cover, wherein the laundering additive is non-water soluble;
an inner satchel positioned within the pouch, wherein the inner satchel comprises an inner satchel fabric and an inner satchel compound which is different from the wash composition;
wherein the inner satchel fabric is fastened together with an inner satchel thread, wherein the inner satchel fabric is fastened around the inner satchel compound, and wherein the inner satchel thread is water soluble.

15. The unit dose pack of claim 14 wherein the laundering additive comprises a fabric softener.

16. The unit dose pack of claim 14 wherein the laundering additive comprises a fragrance.

17. The unit dose pack of claim 14 wherein the wash composition further comprises an enzyme, an optical brightener, and a soil anti-redeposition agent.

* * * * *